Oct. 6, 1959    O. CARLSON    2,907,280
FLEXIBLE STABILIZER BAR FOR THE TRACK ROLLER
AND MEAT HOOK UNIT ON OVERHEAD
CONVEYOR TRACKS
Filed July 25, 1957
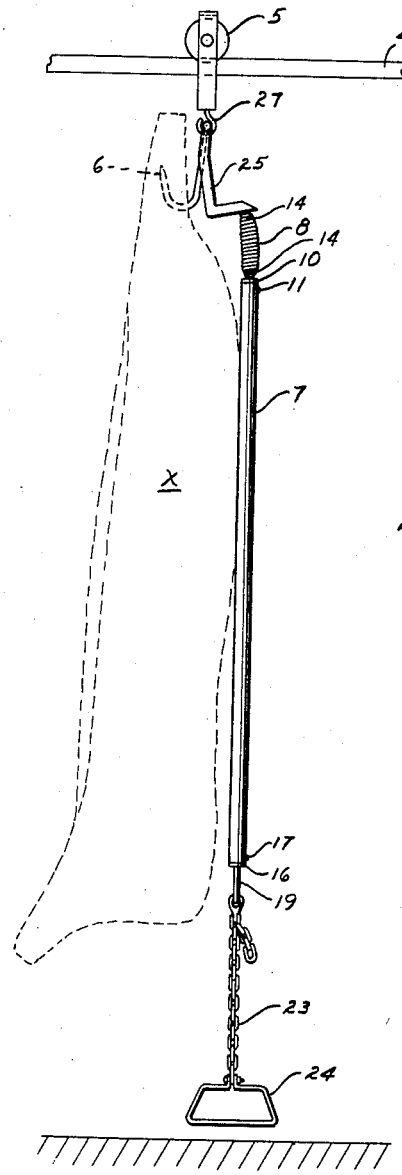
FIG. 1
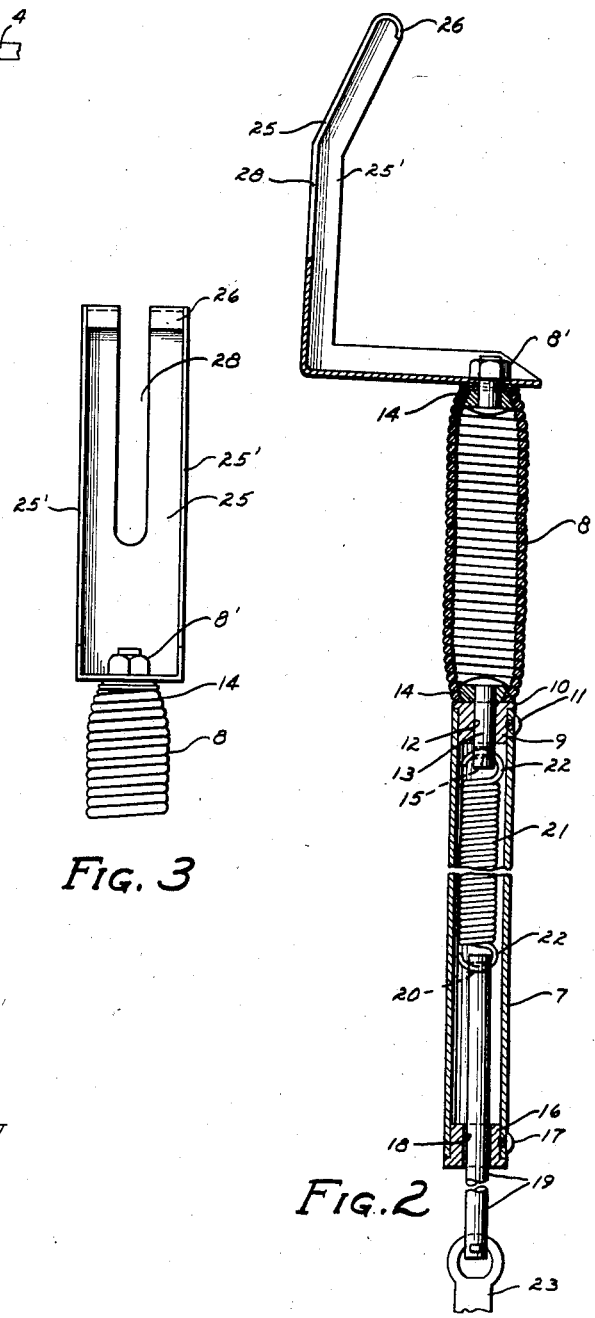
FIG. 3
FIG. 2
INVENTOR.
OLIVER CARLSON
BY
ATTORNEY

2,907,280

FLEXIBLE STABILIZER BAR FOR THE TRACK ROLLER AND MEAT HOOK UNIT ON OVERHEAD CONVEYOR TRACKS

Oliver Carlson, Minneapolis, Minn.

Application July 25, 1957, Serial No. 674,133

3 Claims. (Cl. 104—89)

This invention relates broadly to conveyor systems; more particularly to conveyor systems employing an overhead track as a supporting means and specifically to a stabilizer bar for anchoring the track roller and its attached material handling hook on the track of such a system at any desired point against vertical movement.

Particularly in the meat packing and processing industry, it is well known that conveyor systems employing the use of overhead tracks, are widely used in the movement of slaughtered animal carcasses from one point to another in the packing or processing plant. The system is also in almost universal use in private markets, freezer locker plants and the like. It will also be understood that while the invention described and claimed herein is specifically designed for use in the industry as described aforesaid, it is capable, with minor changes in its material handling elements, of being adapted to use wherever the overhead track conveyor system is used.

In the meat packing and processing industry conveyor systems of the type described comprise the overhead mono-rail offset track system cooperating with a track roller having an attached meat or material engaging hook depending from said track roller, the said track roller and its depending hook being removably mounted on said track system by lifting the combined track roller and its hook member from engagement with the track system.

By virtue of the fact that the movable unit is readily removable from said track, and the fact that the track roller unit and its mounted hook member are pivotally connected, it has always been a problem and a hazard for a lone operator to remove a carcass from the depending meat hook, with said hook often firmly embedded in the carcass, without also disengaging the track roller from the track and thereby allowing this heavy roller unit to drop and swing on its pivotally mounted hook member and often strike and injure said operator. Obviously there is no base of resistance against the lifting movement in a vertical plane, of the heavy carcass or other material from engagement with the hook member which is usually deeply embedded in the carcass. It is usually necessary to require the services of an extra operator to disengage the hook from the carcass and hold the track roller in engagement with the track while another operator lifts the carcass to free the same from said hook.

To overcome this problem and to make possible the handling of a carcass by a lone operator, I have conceived the invention described and claimed herein, and thus;

The principal object of this invention is to provide a stabilizer bar designed to cooperate with the track roller and its hook member, of an overhead conveyor system, whereby the said track roller and hook unit are anchored on the supporting track at any desired position particularly against upward vertical movement or inadvertent disengagement of the said roller from said track.

A further object of this invention is to provide a stabilizer bar of the class described wherein said bar is longitudinally flexible to overcome carcass contours and make possible the substantially parallel vertical arrangement of said stabilizer bar relative to a carcass suspended from the conveyor system.

Another object of this invention is to provide a stabilizer bar of the class described that is longitudinally adjustable in a vertical plane to compensate for varying distances of the track system from the floor as the same varies in many installations.

A still further object of this invention is to provide a stabilizer bar of the class described that will afford a base of resistance against the upward lifting movement in a vertical plane of material suspended from the material handling member forming a part of the movable unit of a conveyor system.

These and other objects of the invention will become apparent from the following specification and claims taken in conjunction with the appended drawings which form a part of this application and in which drawings, like characters indicate like parts throughout the several views.

To the above end generally stated, the invention consists of the novel devices and combination of devices hereinafter described and defined in the claims.

Referring to the drawings:

Fig. 1 is a full elevational view of the invention installed on a track roller and material hook of an overhead conveyor system and diagrammatically showing an animal carcass suspended from the said material hook.

Fig. 2 is a sectional view of the invention in side elevation on an enlarged scale, the longitudinal central and lower portions thereof being broken away, and Fig. 3 is a front elevational view of the upper end portion of the invention on an enlarged scale.

The reference character X is directed to a simulated side of beef or the like suspended from a conventional overhead conveyor system of the type employing a suspended mono-rail track 4. Of the other conventional components of such a conventional conveyor system it is important for the purpose of this application to note the track roller unit 5 as an entirety, and the material handling hook member 6.

While it will be understood as aforesaid, this invention is capable of use in cooperation with conveyor systems of the class described for the handling of any bulky or heavy materials and the only change that would be required for almost universal adaptation would obviously be a change in the material handling member, as shown, a hook 6. In the interest of clarity, however, for the purpose of this application this member 6 will hereinafter be referred to as a meat hook of which there are of course many variations also for use in the handling of many different cuts of meat or for the handling of different types of animal carcasses.

The numeral 7 indicates a relatively long stiff tubular member having a detachably connected heavy stiff coiled spring 8 affixed to its upper end portion. This coiled spring 8 is attached to the said upper end portion of the tubular member 7 by means of a flanged internal sleeve 9 having an annular external flange 10 that impinges the upper end portion of the bar 7 to limit the downward movement of the said sleeve 9 in the tubular bar 7. It will be understood that the sleeve 9 has a tight working fit with the inside diameter of the upper end portion of the tubular member 7 and is held positioned therein by means of a set screw 11 that has screw threaded engagement with a transverse threaded bore in the wall of the tubular member 7. The coiled spring 8 and the flanged sleeve 9 are held connected the one to the other by any suitable means, however as shown, the sleeve 9 is provided with a longitudinally disposed axial bore 12 through which extends a long heavy headed bolt 13. It is important to note that the upper and lower convolutions of the coiled spring 8 are wound to provide slightly tapered upper and lower end portions of the said spring 8, see numeral 14, to facilitate lateral bending movements of the spring 8. A transverse bore 15 is located adjacent the lower end portion of the long bolt 13 for a purpose that will presently be described.

The lower end portion of the tubular member 7 is also terminated in a flanged sleeve 16 that in its commercial form will be identical with the sleeve 9 and is also held against axial rotation and endwise movements by means of a set screw 17 having threaded engagement with a threaded transverse bore in the tubular member 7. It will be understood that in actual practice, it is possible that the set screws 11 and 17 respectively, may also engage a threaded transverse bore in the respective sleeve members 9 and 16, the same being in register with the transverse threaded bores in the walls of the tubular member 7, as described, to more rigidly attach the said sleeves 9 and 16 to the tubular member 7. The sleeve 16 also is provided with a longitudinally disposed axial bore 18 and a relatively long heavy link 19, having a transverse bore 20 adjacent its upper end portion, extending through said bore 20 into the lower end portion of the tubular member 7 and outwardly thereof a substantial distance. This link 19 is dimensioned for free endwise movement in the bore 18.

A long heavy and relatively stiff coiled spring 21, the respective end portions of which are terminated in hooks 22 which engage the transverse bores 15 and 20 in the lower end portion of the long bolt 13 and the upper end portion of the link 19. It will thus be seen that when assembled, the coiled spring 21 will float in the tubular member 7 and that portion of the inner end of the link 19 that extends into the central bore of the tubular member 7, will govern the amount of tension or strain that may be placed on the coiled spring 21 as will presently be described.

A snap fastener of conventional design or its equivalent is pivotally attached to the lower end portion of the link 19 to provide means for engaging a heavy link chain 23 having relatively wide open links to afford means for adjusting the device for proper overall length between the overhead track and the underlying floor. A foot stirrup 24 is attached by suitable means to the lower end portion of the chain linkage 23 for a purpose that will become apparent.

Rigidly attached to the upper end portion of the coiled spring 8 by means of a headed nut-equipped bolt 8' is a meat hook engaging member 25 in the form of a rearwardly offset fork. In front elevation, as shown in Fig. 3, this fork extends rearwardly in a horizontal plane and thence upwardly and forwardly at its upper end portion and is centrally slotted in a vertical plane through a substantial part of its upstanding section. This fork is preferably formed of channel iron, the flanges 25' thereof serving to strengthen and stiffen the same. The extreme upper end portions of the fork 25 are bent further forwardly to form a pair of hooks 26 that engage the swivel mounted meat hook 6 and its swivel linkage 27 while the slot 28 permits the upper end of the shank of the hook 6 to be held aligned in a vertical plane between the upstanding pair of fingers of the fork 25. The structure of this fork member 25 is highly important to the successful operator of the invention and is the result of much experimentation and thought in order to achieve the desired end.

To describe the method of engaging the fork 25 with the meat hook 6 and its swivel link 27, the said fork, on the upper end of the assembled unit, its channeled surfaces facing rearwardly toward the operator, is moved into engagement with the shank of the hook 6, said hook shank being in the slot 28 between the upstanding fingers of the fork 25. It is important to note here that the eye in the upper end portion of the meat hook 6 and the eye in the lower end portion of its swivel linkage 27 are at 90° to one another when assembled and hence with the point of the hook member 6 pointing rearwardly as is required for proper engagement with the fork 25, the open eye of the hook is at right angles to the axis of the shank of said hook and is of such diameter as to permit said eye to enter between the rearwardly projecting flanges 25' of the fork 25. Conversely, the eye of the swivel linkage 27, relative to the eye of the hook member 6 will be at 90° thereto and thus permit the fingers of the fork 25 to slide downwardly and out of engagement with the eye of the swivel linkage 27 and permit the hook like end portions 26 of the fork to engage the periphery of the upper edge of the eye of the hook 6. The engagement of the hook like end portions of the fork and the shank of the meat hook aligned between the said fingers of the fork provides for close interlocking engagement between the said hook and fork and which engagement is multiplied greatly by downward pressure exerted on the unit as an entirety. With the unit properly assembled for length and to allow for ample movement between the normal free swinging position of the stirrup 24 and the floor, the operator places a foot in the stirrup and by his weight forces the same to the floor thus placing the spring 21 and its connected components under strain to tightly hold the engaged hook 6 in position and the track roller unit 5 on the overhead track 4, while lifting movement is exerted by the arms of the operator to remove an animal carcass suspended from the hook 6.

The coiled spring 8 affords longitudinal adjustment of the unit by permitting the entire assembly to bend around carcass contours and thus permit a more direct downward application of force by the operator and also to offset the tendency of the unit to force the carcass out of the perpendicular when downward force is exerted on the stirrup.

While the means for activating the device described herein has been described and illustrated as a relatively wide open stirrup, it is also possible and desirable to replace the stirrup with a foot plate or treadle, one end portion of which will be raised above the floor and hang suspended from the lower end portion of the adjustable means, and the other end portion of said treadle will rest on the floor. The purpose of such a treadle is obviously to overcome the possible difficulty of an operator carrying a heavy animal carcass in his arms preparatory to hanging the same on the meat hook and encountering difficulty in placing his foot in the opening of the free swinging stirrup. With such a foot treadle, it would only be necessary to locate said treadle with his foot and then step on the same, thus placing the entire assembly under tension.

It will thus be seen that by anchoring the track roller unit relative to its track, and by overcoming the flexibility normally existing between the meat hook and its swivel linkage, and by further positioning the meat hook to facilitate carcass removal therefrom, a lone operator may remove said carcass from the hook with ease and perfect safety.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein or required by the prior art.

What I claim is:

1. A flexible stabilizer bar in combination with material handling means suspended from the track roller of a rail-type overhead conveyor system, comprising in combination, an elongated tubular link-bar, means resiliently connecting said link-bar at its upper end portion to the track roller of the conveyor system, secondary resilient means housed within said tubular link-bar and secured thereto at the upper end portion thereof, a secondary link-bar connected to the last noted resilient means at the lower end portion thereof, said secondary link-bar extending outwardly of the lower end portion of the tubular link-bar to normally extend the operating length of the combined link-bars and co-operating flexible connections, rigid means secured to the first noted resilient means at the upper end thereof, constructed and dimensioned for separable engagement with the material handling means, and a foot engaging member adjustably secured to the secondary link-bar at its lower end portion, whereby downward pressure thereon will place the secondary resilient means and connected components under strain against upward movement relative to the track of the conveyor system when upward lifting movement is imparted to the material handling means.

2. A flexible stabilizer bar in combination with material handling means suspended from the track roller of a rail-type overhead conveyor system, comprising in combination, an elongated tubular link-bar having an open passageway in its lower end portion and a stiff coiled spring rigidly mounted on the upper end thereof, an offset upstanding forked member rigidly secured to the upper end portion of said stiff coiled spring and having separable engagement with the material handling means suspended from the track roller, a secondary coiled spring housed within the tubular link-bar, said secondary coiled spring being rigidly secured at its upper end portion to a fixed member within the tubular link-bar and having a secondary link-bar secured to the lower end portion thereof, said secondary link-bar extending outwardly of the lower end portion of the tubular link-bar, and foot engaging stirrup means flexibly secured to the lower end portion of the secondary link-bar whereby downward pressure thereon will place the secondary coiled spring and connected components under strain of upward movement imparted to the material handling means relative to the track of the conveyor system.

3. The structure defined in claim 2, wherein the forked member is angularly off-set in L shape having a pair of parallel, laterally spaced upstanding fingers having a wide slot therebetween to engage the material handling means, said fingers being rearwardly inclined at their upper end portions and terminating in a pair of downwardly and rearwardly curved hooks.

References Cited in the file of this patent

UNITED STATES PATENTS

| | | |
|---|---|---|
| 2,412,746 | Parker | Dec. 17, 1946 |
| 2,566,962 | Ramsey | Sept. 4, 1951 |
| 2,724,342 | Anderson | Nov. 22, 1955 |
| 2,761,394 | Cantrell et al. | Sept. 4, 1956 |